July 26, 1938.   A. A. SKVORTZOFF   2,125,089
BUSHING STRUCTURE
Filed Oct. 9, 1936
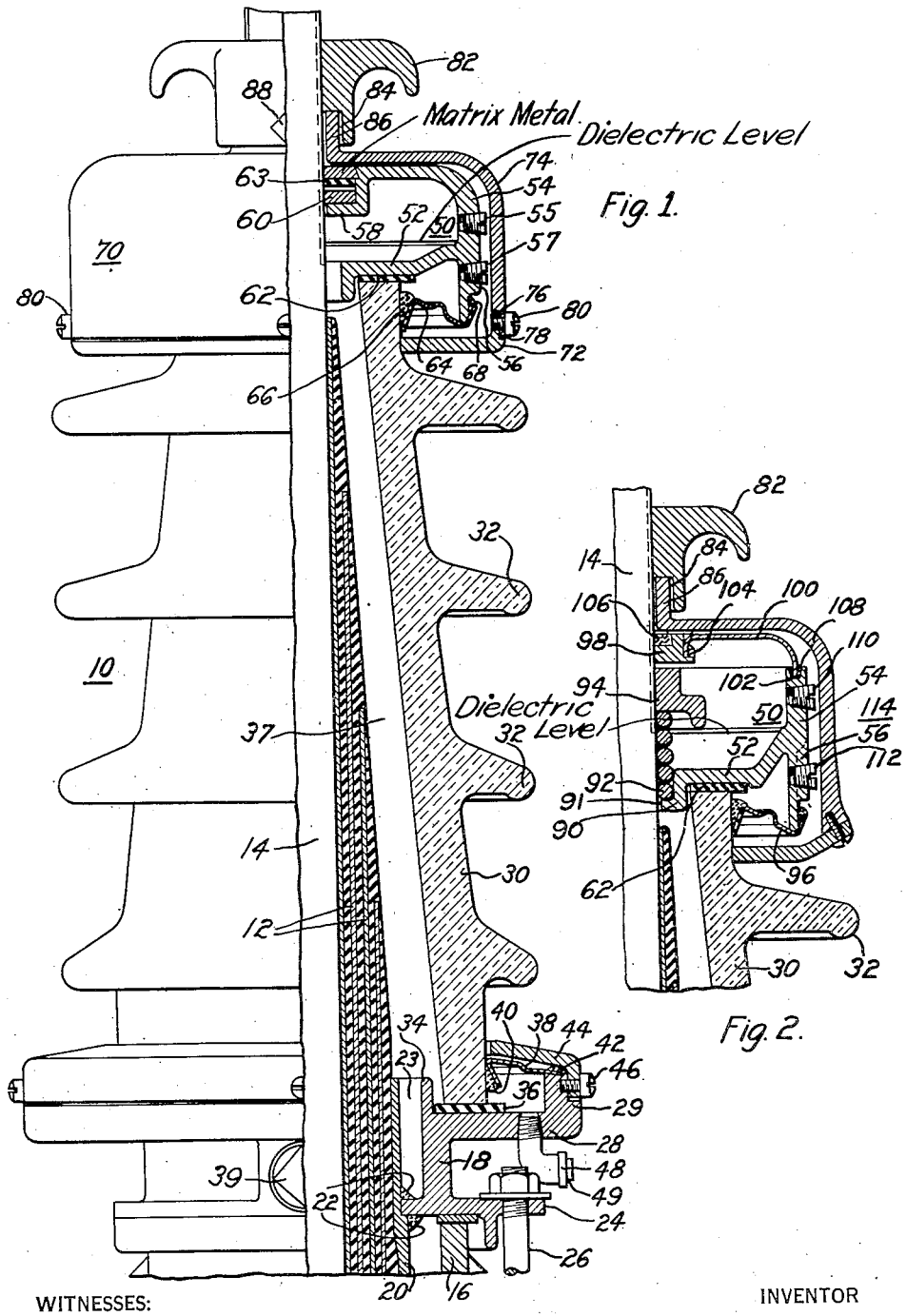
WITNESSES:
Wm. B. Sellers
James K. Ely
INVENTOR
Alexander A. Skvortzoff.
BY Ezra W. Savage
ATTORNEY Patented July 26, 1938

2,125,089

UNITED STATES PATENT OFFICE 2,125,089

BUSHING STRUCTURE

Alexander A. Skvortzoff, Sharon, Pa., assignor to Westinghouse Electric & Manufacturing Company, East Pittsburgh, Pa., a corporation of Pennsylvania Application October 9, 1936, Serial No. 104,838

7 Claims. (Cl. 173—318)

This invention relates to bushing structures, and particularly to condenser bushing structures.

An object of this invention is the provision of a hermetically sealed bushing.

Another object of this invention is the provision of a hermetically sealed flexible expansion chamber in a bushing whereby relative movement between sealed parts is permitted without damage to the seals between parts.

Another object of this invention is to provide for protecting the seals in a hermetically sealed bushing.

This invention, together with other objects thereof, will be better understood from the following description when taken in conjunction with the accompanying drawing, in which:

Figure 1 is a side elevational view, partly in section, of the bushing structure embodying the teachings of this invention, and Fig. 2 is a side elevational view, partly in section, of a modification of the bushing structure embodying the teachings of this invention.

Referring to the drawing and Fig. 1 in particular, this invention is illustrated with reference to a condenser bushing 10. The bushing 10 comprises a plurality of suitably spaced conductor elements 12 which form a condenser disposed on a conductor 14 of copper or similar material which may be in the form of a rod, bar or tube of suitable length for extending into the casing of a transformer (not shown) or other electrical apparatus. In practice, a boss 16 is usually provided on the cover of the electrical apparatus on which the bushing is to be employed for receiving the bushing.

As shown in Fig. 1, in order to facilitate the mounting of the bushing 10, a bushing flange or annular member 18 of a suitable cast material such as brass is provided around the spaced conductor elements 12 for seating on the boss 16. The annular member 18 is secured to a tube 20 provided around the condenser or spaced conducting elements 12 by some suitable means such as a weld 22.

In assembling the bushing, the tube 20, which is machined to conform with and make a tight fit with the spaced conductor elements 12, is forced over the spaced conductor elements. In order to mount the annular member 18, the annular member may be preheated to cause it to expand and then positioned about the tube 20 where it contracts and compresses the conductor elements 12 and the tube 20 to provide an oil-tight joint therebetween. The space 23 between the tube 20 and annular member 18 forms a pocket into which impurities and sediment may collect as will be understood by those skilled in the art.

The annular member 18 carries an outwardly extending flange 24 suitable for receiving bolts 26 for securing the bushing to the cover (not shown) of the case containing electrical apparatus with which the bushing is to be employed. A second outwardly extending flange 28 having an upwardly projecting lip 29 is also carried by the annular member 18, the purpose of which will be more fully explained hereinafter.

In order to protect the spaced conductor elements 12, a tube 30 of dielectric material such as porcelain or the like, having spaced annular surface creepage flanges 32 distributed along its outer side, is so disposed in spaced relation to the elements 12 as to seat on the upper side of the flange 28 of annular member 18. An upwardly projecting lip 34 carried by the inner edge of the annular member 18 assists in guiding and seating the dielectric tube 30 on the flange 28. A sealing gasket 36 of some suitable material is disposed between the base of the dielectric tube 30 and the annular member 18 for providing a tight joint therebetween. The space 37 between the conductor elements 12 and the tube 30 is adapted to be filled with a suitable asphalt base compound or oil, the level of which is indicated in the drawing in the expansion chamber described hereinafter. The level of the dielectric will vary somewhat in response to operating conditions expanding when heated. In order to admit the compound or oil into the space within the bushing, an opening provided with a plug 39 is disposed in the annular member 18.

In order to insure that a leak-proof joint is provided between the tube 30 and the annular member 18, and to protect the sealing gasket 36 from damage, a flexible sheet member 38 of copper or some similar material is disposed about the outer side walls of the dielectric tube 30 near its lower end and extends outwardly from the dielectric tube to the upper edge of the upwardly extending lip 29 of the flange 28. The edges of the flexible metal member 38 are secured to the dielectric tube 30 and the lip 29 of the flange 28 by means of solder seals 40 and 42, respectively, to provide a hermetically sealed chamber about the sealing gasket 36.

In order to protect the flexible metal member 38 from damage due to electrical or mechanical means, a housing 44 of aluminum or some other similar material is disposed above the member 38 and is secured to the lip 29 of the flange 28 as by means of screws 46. The solder seals 40 and 42 may be tested for leaks by forcing air under pressure through the outlet 48 which is carried in the flange 28 into the chamber formed by the flexible metal member around the gasket. The outlet 48 is normally closed by a plug 49 which is removable when it is desired to test the seals.

In order to seal the upper end of the condenser structure for preventing the breathing in and out of air and moisture in the bushing and to permit the expansion of the conductor without damage to the spaced conductor elements, a hood 50 of some suitable metal, such as bronze, is disposed about the end of the conductor 14 over the end of the dielectric tube 30.

The hood 50 comprises an annular member 52 having flanges 54 and 56 which extend in opposite directions at its outer edge. As will be seen from Fig. 1, the flange 54 curves backwardly on the annular member 52 to a point in proximity to the conductor 14. The end of the flange 54 adjacent the conductor 14 terminates in a shelf 58 of substantially L-shape in cross-section for receiving a nut 60 which is adapted to be threaded on the conductor 14. A sealing gasket 62 is so disposed between the end of the dielectric tube 30 and the annular member 52 that when the nut 60 is threaded into position engaging the end of the L-shaped member 58 of the flange 54, the annular member 52 compresses the sealing gasket 62 to form a tight joint between the annular member 52 and the dielectric tube 30.

In order to seal the joint between the flange 54 and the conductor 14, suitable material such as the matrix metal consisting of 48% bismuth, 28.5% lead, 14.5% tin and 9% antimony is deposited between the conductor and the flange 54 above the nut 60. As shown in the drawing, a gasket 63 may be employed above the nut 60 for retaining the matrix metal as it is deposited.

Since it is possible that, after a period of time, leaks may be encountered in the sealing gasket 62, it is desired to provide for hermetically sealing the hood 50 to the dielectric tube 30. In order to protect the sealing gasket 62, a flexible metal member 64 is disposed about the side wall of the dielectric tube 30 near its upper end and extends outwardly therefrom to the lower edge of flange 56 of the hood 50. The flexible metal member 64 is similar to flexible metal member 38 and is secured to dielectric tube 30 and the flange 56 by means of solder seals 66 and 68 respectively.

In order to independently test the seals formed by the matrix metal and the seals with the flexible metal member, plugs 55 and 57 are removably disposed in flanges 54 and 56, respectively. These plugs may be removed to permit the admission of air under pressure to the chambers formed by the flanges 54 and 56.

In order to protect the seals of the matrix metal and the solder and the flexible metal member from electrical and mechanical damage, a housing 70 of aluminum or the like is disposed about the end of the dielectric tube 30 and the hood 50. The housing 70 comprises an annular holding member or ring 72 suitably carried on the end of the dielectric tube 30 and projecting outwardly a sufficient distance to clear the hood 50, and an annular member 74 of a shape corresponding to the shape of the flanges 54 and 56 of the annular member 52. The ring 72 carries an upwardly extending lip 76 for cooperating with and receiving the lower end 78 of the annular member 74. The annular member 74 is secured to the ring 72 by some suitable means such as the screws 80.

In order to assist in maintaining the housing 70 in position about the end of the bushing, a cap or lifting hook 82 of suitable material such as a brass alloy is threaded on the conductor 14. The cap 82 is provided with a chamber 84 for receiving an upwardly extending lip 86 carried at the end of the annular member 74 for holding the annular member against movement. Where desired, a set screw 88 may also be provided carried by the cap 82 for engaging the lip 86 of the annular member 74.

Where the condenser bushing is to be employed with high voltages, or where long conductors are embodied in the bushing, it sometimes is advisable to so construct the hood 50 that relatively large expansion between the conductor 14 and the dielectric tube 30 is permitted. In a preferred modification in which relatively large expansion of the sealed parts is permitted, a flexible metal member similar to the metal members employed in protecting the sealing gaskets 62 and 36 is employed as a part of hood 50.

This preferred modification is shown in Fig. 2. In this modification, the hood 50 provided over the sealing gasket 62 around the end of the dielectric tube 30 and about the conductor 14 comprises the annular member 52 having flanges 54 and 56 extending in opposite directions from the outer edge thereof. The inner edge of the annular member 52 carries a flange 90 from which lugs 91 extend inwardly for receiving the lower end of a helical spring 92 carried about the conductor 14. The lugs 91 carried by the flange 90 are so spaced as to permit the dielectric material to enter the hood 50 from the space within the weather casing. In order to force the annular member 52 downwardly to compress the sealing gasket 62, the helical spring 92 may be placed under compression by threading a nut 94 on the conductor 14 to compress the spring.

A flexible metal member 96 similar to the flexible metal member 64 of the modification shown in Fig. 1 is disposed between the upper end of the dielectric tube 30 and the lower edge of the flange 56 for protecting the sealing gasket 62 and providing a hermetically sealed chamber thereabout.

In order to provide a hermetically sealed chamber between a conductor 14 and the flange 54 of the annular member 52, a nut 98 which carries an outwardly extending flexible metal member 100 is threaded on the conductor 14 to a position where the outer edge of the flexible metal member 100 seats in a recess 102 provided in the flange 54. The metal member 100 and the nut 98 are suitably welded or brazed together as at 104. With the nut and flexible metal member in the position indicated, the nut is sealed to the conductor as by a seal of matrix metal 106 and the outer edge of the flexible metal member is sealed in the recess 102 of the flange 54 by a solder seal 108.

In order to independently test the joints formed by the seals associated with each of the flanges 54 and 56, plugs 110 and 112 are provided in flanges 54 and 56, respectively. These plugs are similar to plugs 55 and 57 shown in Fig. 1 and may be removed for the purpose of admitting air under pressure to the chambers to test the seals.

In order to protect the flexible metal members 96 and 100 from electrical burns or mechanical damage, a housing 114 similar to the housing 70 shown in Fig. 1 is disposed to cover the flexible metal members.

By providing the bushing structure described hereinbefore, it is evident that the expansion chambers provided in the end of the bushing permit the expansion of the conductor under operating conditions without disturbing the seals between the conductor, hood and dielectric tube. Further, by providing for retaining the annular members of the expansion chamber in position about the end of the dielectric tube, the sealing gaskets between the expansion chambers and the dielectric tube are always under compression to provide good joints therebetween.

In addition to providing a hermetically sealed condenser bushing through the use of the flexible metal members in the manner described, the seals and the flexible metal members are protected against electrical or mechanical damage through the provision of the safety housing thereabout, thus permitting the handling of the bushing in an ordinary way without exercising unusual precautions.

Although this invention has been described with reference to a particular embodiment thereof, it is, of course, not to be limited thereto except insofar as is necessitated by the prior art and the scope of the appended claims.

I claim as my invention:

1. A bushing comprising, in combination, spaced conductor elements, a dielectric tube covering at least a part of the spaced conductor elements, a conductor extending from the spaced conductor elements and projecting through the dielectric tube, an annular ring having flanges extending outwardly in opposite directions from its outer edge disposed over an end of the dielectric tube, a sealing gasket between said end of the dielectric tube and the annular ring, means for retaining the ring in position over the end of the tube, means for sealing one of the oppositely extending flanges of the ring to the conductor to provide a hermetically sealed joint therebetween, means for sealing the other of the oppositely extending flanges of the ring to the dielectric tube to provide a hermetically sealed chamber around the sealing gasket, and a housing disposed about the annular ring to protect the seals between the flanges of the ring and the conductor and dielectric tube.

2. A bushing comprising, in combination, spaced conductor elements, a dielectric tube covering at least a part of the spaced conductor elements, a conductor extending from the spaced conductor elements and projecting through the dielectric tube, an annular ring having flanges extending outwardly in opposite directions from its outer edge disposed over an end of the dielectric tube, a sealing gasket between said end of the dielectric tube and the annular ring, means for retaining the ring in position over the end of the tube, said means including a spring for biasing the annular ring to compress the sealing gasket under all operating conditions of the bushing, means for sealing one of the oppositely extending flanges of the ring to the conductor to provide a hermetically sealed joint therebetween, means for sealing the other of the oppositely extending flanges of the ring to the dielectric tube to provide a hermetically sealed chamber around the sealing gasket, and a housing disposed about the annular ring to protect the seals between the flanges of the ring and the conductor and dielectric tube.

3. A bushing comprising, in combination, spaced conductor elements, a dielectric tube covering at least a part of the spaced conductor elements, a conductor extending from the spaced conductor elements and projecting through the dielectric tube, an annular ring having flanges extending outwardly in opposite directions from its outer edge disposed over an end of the dielectric tube, a sealing gasket between said end of the dielectric tube and the annular ring, means for retaining the ring in position over the end of the tube, a ring of flexible sheet-material carried by one of the oppositely extending flanges for cooperating in providing an expansion chamber in the end of the bushing, means carried by the conductor for receiving an edge of the ring, means for sealing the ring to the receiving means and to said one of the flanges, a flexible sheet-material disposed between the other of the oppositely extending flanges and the dielectric tube, means for sealing the flexible sheet to said other flange and to the tube to provide a hermetically sealed chamber around the sealing gasket, and a housing disposed about the chambers to protect the seals.

4. A bushing comprising, in combination, spaced conductor elements, a dielectric tube covering at least a part of the spaced conductor elements, a conductor extending from the spaced conductor elements and projecting through the dielectric tube, an annular ring having flanges extending outwardly in opposite directions from its outer edge disposed over an end of the dielectric tube, a sealing gasket between said end of the dielectric tube and the annular ring, means for retaining the ring in position over the end of the tube, means for sealing one of the oppositely extending flanges of the ring to the conductor to provide a hermetically sealed joint therebetween, means for sealing the other of the oppositely extending flanges of the ring to the dielectric tube to provide a hermetically sealed chamber around the sealing gasket, means in each of the flanges for testing the seals associated with the flanges, and a housing disposed about the annular ring to protect the seals between the flanges of the ring and the conductor and dielectric tube.

5. In an electrical apparatus, in combination, a dielectric tube, a member disposed in spaced relation within the dielectric tube and extending longitudinally thereof and projecting therethrough, a hollow annular member having inwardly extending walls disposed about said member over one end of the dielectric tube for providing an expansion chamber between said member and the dielectric tube, a sealing gasket disposed between said end of the dielectric tube and the annular member, means carried by the longitudinal member for so retaining the annular member in position over the end of the dielectric tube as to compress the sealing gasket and maintain the annular member, dielectric tube and longitudinal member in assembled position under all operating conditions of the apparatus, the lower wall of the annular member cooperating with the gasket and dielectric tube in making a tight joint therebetween, and a flexible member extending from the body of the annular member to the dielectric tube providing a hermetically sealed chamber for the tight joint between the hollow annular member and the dielectric tube.

6. In an electrical apparatus, in combination, a dielectric tube, a member disposed in spaced relation within the dielectric tube and extending longitudinally thereof and projecting therethrough, a hollow annular member having inwardly extending walls disposed about said member over one end of the dielectric tube for providing an expansion chamber between said member and the dielectric tube, a sealing gasket disposed between said end of the dielectric tube and the annular member, means carried by the longitudinal member for so retaining the annular member in position over the end of the dielectric tube as to compress the sealing gasket and maintain the annular member, dielectric tube and longitudinal member in assembled position under all operating conditions of the apparatus, the lower wall of the annular member cooperating with the gasket and dielectric tube in making a tight joint therebetween, a flexible member extending from the body of the annular member to the dielectric tube providing a hermetically sealed chamber for the tight joint between the hollow annular member and the dielectric tube, means for sealing the upper wall of the annular member to the longitudinal member to provide a hermetically sealed joint therebetween, the annular member sealed to the longitudinal member and the dielectric tube providing a hermetically sealed expansion chamber for permitting relative longitudinal movement of the longitudinal member and the dielectric tube while maintaining the joints therebetween leak-proof, and a housing disposed about the annular member to protect the sealed joints.

7. In an electrical apparatus, in combination, a dielectric tube, a member disposed in spaced relation within the dielectric tube and extending longitudinally thereof and projecting therethrough, a hollow annular member having inwardly extending walls disposed over one end of the dielectric tube about the member projecting therethrough for providing an expansion chamber, a sealing gasket disposed between said end of the dielectric tube and the annular member, means cooperating with the longitudinal member for so retaining the annular member in position over the end of the dielectric tube as to compress the sealing gasket and maintain the annular member, dielectric tube and longitudinal member in assembled position under all operating conditions of the apparatus, the lower wall of the annular member cooperating with the gasket and dielectric tube in making a tight joint therebetween, a flexible member extending from the body of the annular member to the dielectric tube providing a hermetically sealed chamber for the tight joint between the annular member and the dielectric tube, and a dielectric material disposed in the space between the longitudinally extending member and the dielectric tube.

ALEXANDER A. SKVORTZOFF.